(12) United States Patent
Yoshida et al.

(10) Patent No.: US 10,295,829 B2
(45) Date of Patent: May 21, 2019

(54) OPTICAL ELEMENT AND DISPLAY DEVICE

(71) Applicant: SEIKO EPSON CORPORATION, Tokyo (JP)

(72) Inventors: Shohei Yoshida, Shimosuwa-machi (JP); Hayato Matsuki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 15/703,152

(22) Filed: Sep. 13, 2017

(65) Prior Publication Data

US 2018/0088337 A1    Mar. 29, 2018

(30) Foreign Application Priority Data

Sep. 26, 2016   (JP) ................................ 2016-186606
Jul. 18, 2017   (JP) ................................ 2017-138794

(51) Int. Cl.
*G02B 27/01*     (2006.01)
*F21V 8/00*      (2006.01)

(52) U.S. Cl.
CPC .......... *G02B 27/0172* (2013.01); *G02B 6/002* (2013.01); *G02B 6/003* (2013.01); *G02B 6/0055* (2013.01); *G02B 2027/0125* (2013.01); *G02B 2027/0178* (2013.01)

(58) Field of Classification Search
CPC ............ G02B 27/0172; G02B 27/0081; G02B 27/0178; G02B 27/017; G02B 27/14; G02B 6/00; G02B 6/002; G02B 6/003; G02B 6/0055; G02B 6/0031; G02B 6/0035; G02B 6/005; G02B 6/0028; G02B 6/0046; G02B 6/0076; G02B 6/0015; G02B 6/10; G02B 5/32; G02B 2027/0178; G02B 2027/0125
USPC .......................... 359/630, 633, 629, 618, 631
See application file for complete search history.

(56) References Cited

U.S. PATENT DOCUMENTS

| 2010/0246004 A1* | 9/2010 | Simmonds ......... G02B 27/0081 |
| | | 359/567 |
| 2013/0163089 A1 | 6/2013 | Bohn |
| 2013/0322810 A1* | 12/2013 | Robbins .................. G02B 5/30 |
| | | 385/11 |

(Continued)

FOREIGN PATENT DOCUMENTS

| JP | 2010-164988 A | 7/2010 |
| JP | 4628360 B2 | 2/2011 |

(Continued)

*Primary Examiner* — Collin X Beatty
(74) *Attorney, Agent, or Firm* — Oliff PLC

(57) ABSTRACT

An optical element includes a plurality of partially reflecting mirrors provided in parallel to each other with an interval therebetween, and a transmittance member interposed between adjacent two partially reflecting mirrors of the plurality of partially reflecting mirrors. The transmittance member has an incidence surface on which an image light and an external light are incident through a light guiding body, and an exit surface from which the image light and the external light are exited to an observer side. Each of the plurality of partially reflecting mirrors is disposed so as to be inclined with respect to the incidence surface and the exit surface, and a reflectance of light incident at a relatively small incidence angle with respect to surfaces of each partially reflecting mirror is lower than a reflectance of light incident at a relatively large incidence angle.

6 Claims, 6 Drawing Sheets

(56) References Cited

U.S. PATENT DOCUMENTS

| | | | |
|---|---|---|---|
| 2015/0260994 A1* | 9/2015 | Akutsu | G02B 6/34 359/567 |
| 2016/0041387 A1* | 2/2016 | Valera | G02B 27/0081 385/36 |
| 2016/0124223 A1* | 5/2016 | Shinbo | G02B 27/0101 385/37 |
| 2017/0003505 A1* | 1/2017 | Vallius | G02B 5/1819 |
| 2017/0031171 A1* | 2/2017 | Vallius | G02B 5/1819 |

FOREIGN PATENT DOCUMENTS

| | | |
|---|---|---|
| JP | 2013-210633 A | 10/2013 |
| WO | 01/95027 A2 | 12/2001 |
| WO | 03/081320 A1 | 10/2003 |
| WO | 2005/024491 A1 | 3/2005 |

\* cited by examiner

OPTICAL ELEMENT AND DISPLAY DEVICE

BACKGROUND

1. Technical Field

The present disclosure relates to an optical element and a display device.

2. Related Art

Recently, an image display device of a type used by being worn on the head of an observer such as a head-mounted display is provided as one of wearable information devices. There is also known an image display device capable of recognizing simultaneously and visually both an image generated by a display element and an external image when the observer wears the image display device, that is, a so-called see-through type image display device.

JP-A-2013-210633 discloses a head-mounted display system including a substrate and a plurality of partial reflection surfaces provided inside the substrate. In the system, a part of the light guided inside the substrate is reflected by the plurality of partial reflection surfaces and guided to the eye of an observer. JP-A-2013-210633 discloses that a reflectance of light with an incidence angle of 70° is 22% and a reflectance of light with an incidence angle of 60° is 6% to 7% as an example of reflection characteristics of the partial reflection surface.

JP-A-2010-164988 discloses a head-mounted display system including a substrate and a plurality of selective reflection surfaces provided inside the substrate. In the system, a part of light guided inside the substrate is reflected by the plurality of selective reflection surfaces and guided to the eyes of an observer. JP-A-2010-164988 discloses that a reflectance decreases as an incidence angle of light increases, as an example of reflection characteristics of the selective reflection surfaces.

In the systems described in JP-A-2013-210633 and JP-A-2010-164988, light guided inside the substrate is extracted to the outside by the reflection surface provided inside the substrate, and guided to the eye of an observer. Instead of this configuration, a display device is provided which includes a light guiding body that guides image light and an optical element having a plurality of partially reflecting mirrors for extracting the image light from the light guiding body to the observer side. The display device has peculiar problems, that the image light not extracted to the observer side leaks from a backside of the light guiding body to the outside and a part of an image is viewed to a person other than the observer, in a configuration in which an optical element is disposed on a surface of the image guiding body.

SUMMARY

An advantage of some aspects of the embodiment is to provide a display device capable of reducing leaks of image light to an opposite side of an observer after passes through a light guiding body. In addition, another advantage of some aspects of the embodiment is to provide an optical element suitable for being used for a light exit portion of the display device.

According to an aspect of the embodiment, there is provided an optical element including a plurality of partially reflecting mirrors that are provided in parallel to each other with an interval therebetween, reflect a part of an image light and a part of an external light, and transmit the other part of the image light and the other part of the external light; and a transmittance member that is interposed between adjacent two partially reflecting mirrors of the plurality of partially reflecting mirrors, in which the transmittance member has an incidence surface on which the image light and the external light are incident through a light guiding body, and an exit surface from which the image light and the external light are exited to an observer side, and in which each of the plurality of partially reflecting mirrors is disposed so as to be inclined with respect to the incidence surface and the exit surface, and a reflectance of light incident at a relatively small incidence angle with respect to surfaces of each partially reflecting mirror is lower than a reflectance of light incident at a relatively large incidence angle.

As will be described below in detail, as a review result of the inventors, leaks of image light from the aforementioned optical element are caused by the fact that a reflectance of light incident at a small incidence angle with respect to a surface of a partially reflecting mirror is high, and the light returns to the light guiding body from an optical element is much. In the optical element according to the aspect of the embodiment, since a reflectance of the light incident at a relatively small incidence angle with respect to the surface of each partially reflecting mirror is lower than a reflectance of light incident at a relatively large incidence angle, in a case where the optical element is installed on one surface of the light guiding body, it is possible to reduce leaks of the image light to a side opposite to the optical element through the light guiding body, that is, a side opposite to an observer.

In the optical element according to the aspect of the embodiment, an angle formed between each of the plurality of partially reflecting mirrors and the exit surface may be larger than or equal to 45° and smaller than 90°.

According to the configuration, it is possible to efficiently extract image light incident from a light guiding body at a large incidence angle with respect to an incidence surface of the optical element after being guided by the light guide.

According to another aspect of the embodiment, there is provided a display device including an image forming device; and a light guiding device that guides image light that is generated by the image forming device. The light guiding device includes an incidence portion on which the image light is incident, a light guiding body that guides the image light which is incident from the incidence portion, and an exit portion from which the image light is exited. The exit portion includes the optical element according to an aspect of the embodiment.

The display device according to the aspect of the embodiment includes an exit portion having an optical element according to the aspect of the embodiment, and thereby, it is possible to realize a display device capable of making persons other than an observer not view an image.

In the display device according to the aspect of the embodiment, the exit portion may be provided on a surface on a viewing side of the light guiding body.

According to the configuration, it is possible to realize a display device whose optical design can be easily performed.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, an embodiment will be described with reference to the drawings.

A display device according to the present embodiment is used as, for example, a head-mounted display used by being worn on the head of an observer.

Figure 1:
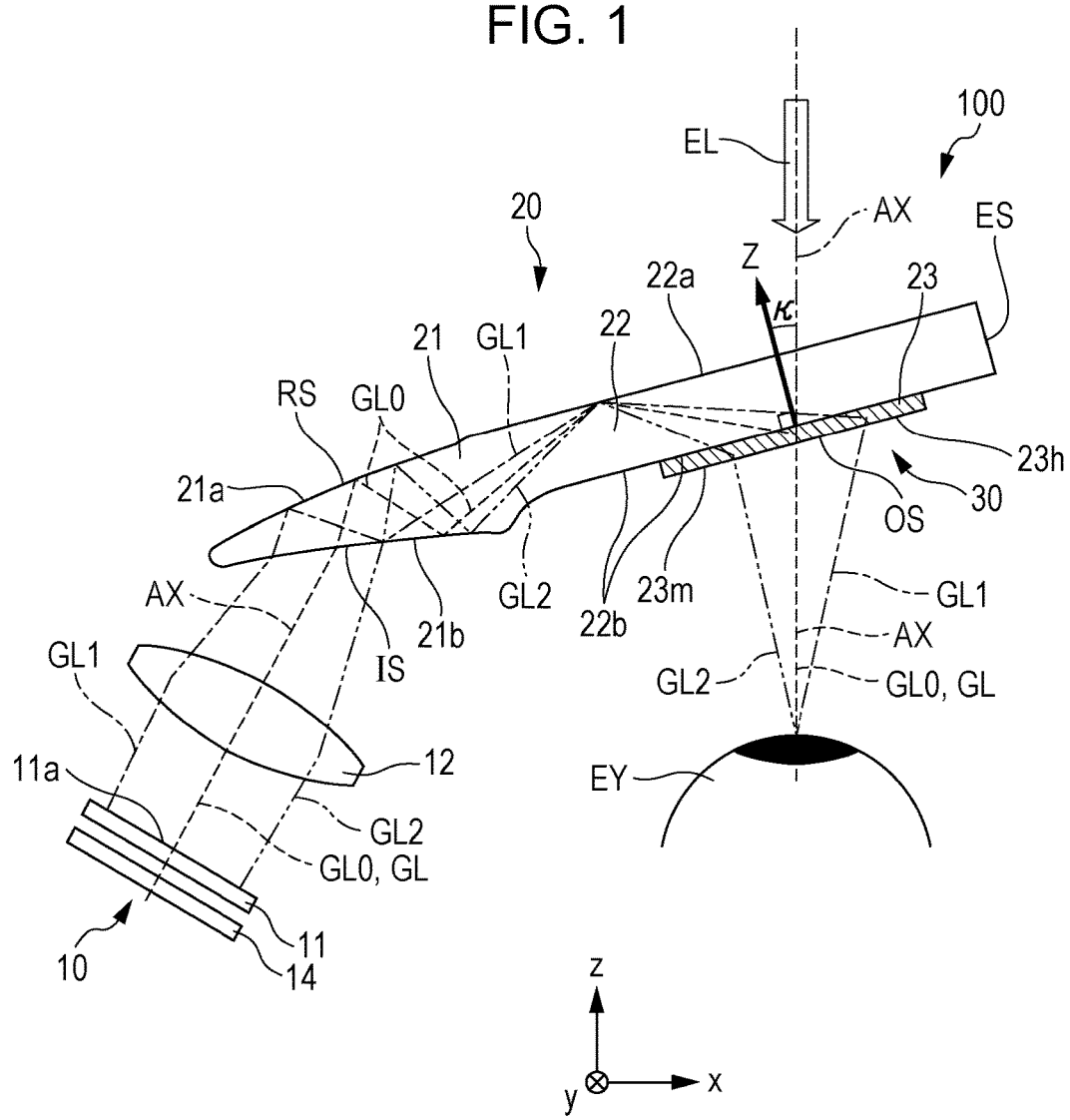
FIG. 1 is a plan view of a display device according to an embodiment.
Figure 2:
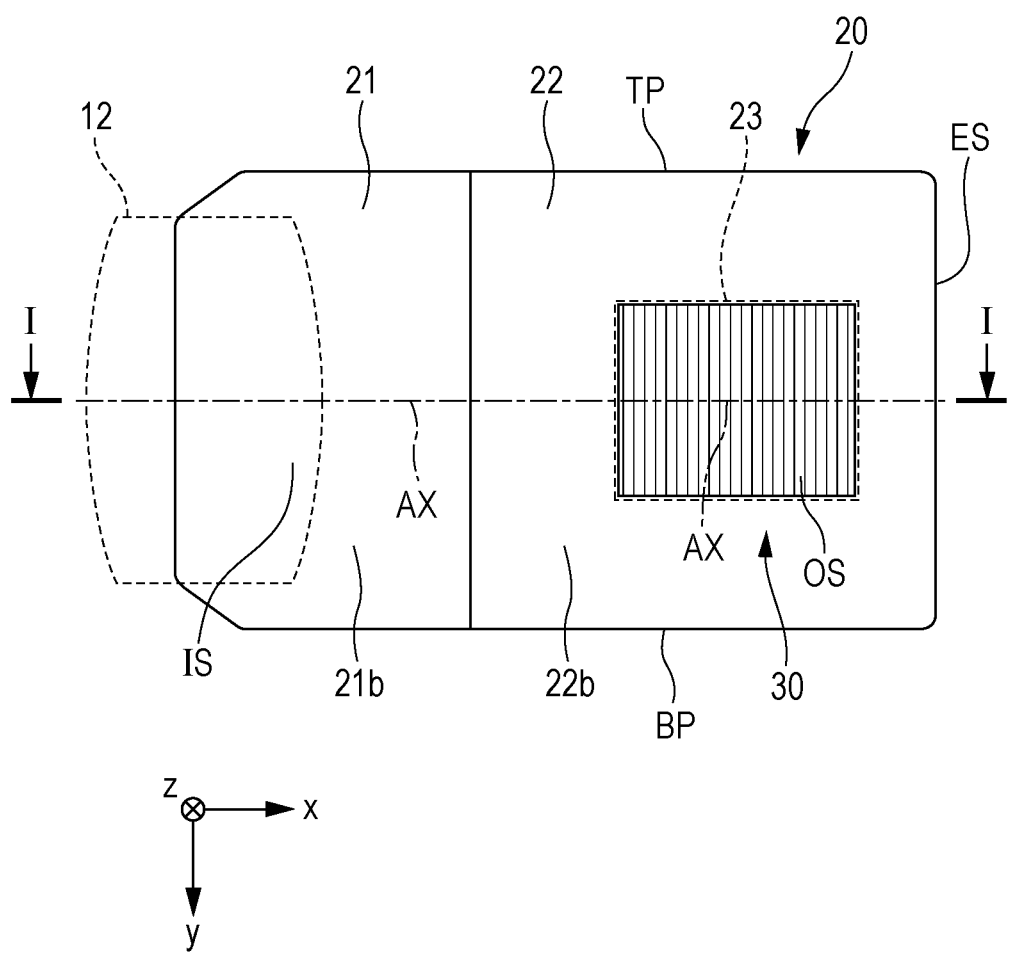
FIG. 2 is a rear view of a light guiding device viewed from an observer side.
Figure 3:
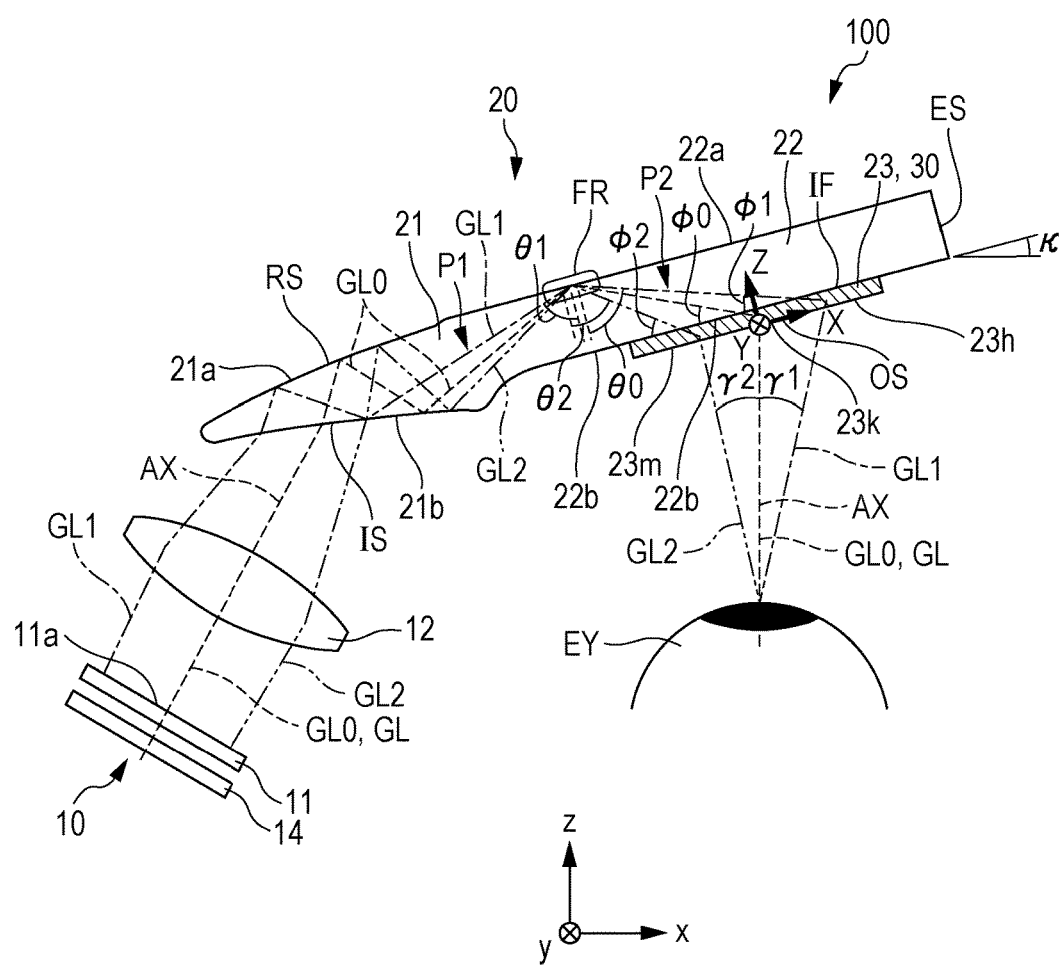
FIG. 3 is a view illustrating a light path of image light in the light guiding device.

FIG. 1 is a plan view of the display device according to the embodiment. FIG. 2 is a rear view of a light guiding device viewed from an observer side. FIG. 3 is a view illustrating a light path of image light in the light guiding device.

In the following drawings, scales of dimensions may be changed by configuration elements so as to make each configuration element be easily viewed.

Overall Configuration of Light Guiding Device and Display Device

As illustrated in FIG. 1, the display device 100 includes an image forming device 10 and a light guiding device 20. FIG. 1 corresponds to a cross section I-I of the light guiding device 20 illustrated in FIG. 2.

The display device 100 allows the observer to view an image formed by the image forming device 10 as a virtual image and allows an observer to observe an external image in a see-through manner. The display device 100 includes the image forming device 10 and the light guiding device 20 which are provided by one pair in correspondence with the right eye and the left eye of the observer. A device for the right eye and a device for the left eye are the same in configuration, and are different only in a point where each configuration element is bilaterally symmetrical in disposition. Accordingly, only the portion for the left eye is illustrated, and illustration of the portion for the right eye is omitted here. The display device 100 has an appearance like, for example, eyeglasses as a whole.

The image forming device 10 includes an organic electroluminescence (EL) element 11 and a projection lens 12. The organic EL element 11 exits image light GL forming an image such as a moving image and a still image. The image forming device is not limited to the organic EL element 11, and may use an image forming device including a liquid crystal element and the like. The projection lens 12 is configured with a collimator lens which converts the image light GL exited from each point on the organic EL element 11 into substantially parallel rays. The projection lens 12 is formed of glass or plastic, and is not limited to one piece, and may be configured with a plurality of lenses. The projection lens 12 is not limited to a spherical lens, and may be an aspherical lens, a free curved surface lens, or the like.

The light guiding device 20 is configured with a light transmittance member of a flat shape. The light guiding device 20 guides the image light GL generated by the image forming device 10 and then exits the light toward the eye EY of an observer, while transmitting external light EL forming the external image. The light guiding device 20 includes an incidence portion 21 on which image light is incident, a parallel light guiding body 22 that mainly guides the image light, and an exit portion 23 that exits the image light GL and the external light EL. The parallel light guiding body 22 and the incidence portion 21 are integrally formed of a resin material with high light transmittance. In the present embodiment, the light path of the image light GL propagating through the light guiding device 20 is configured with a light path of one type that reflects light in the same number of times, and may not be a combination of a plurality of types of light paths.

The parallel light guiding body 22 is disposed to be inclined with respect to the optical axis AX which uses a visual line as a reference when the eye EY of the observer looks at the front. A normal direction Z of a flat surface 22a of the parallel light guiding body 22 is inclined by an angle κ with respect to the optical axis AX. Thereby, the parallel light guiding body 22 can be disposed along a front face of the face of the observer, and a normal line of the flat surface 22a of the parallel light guiding body 22 is inclined with respect to the optical axis AX. As such, By inclining the normal line of the flat surface 22a of the parallel light guiding body 22 is inclined by the angle κ with respect to the z direction parallel to the optical axis AX, the image light GL0 on and around the optical axis AX which is exited from the optical element 30 forms an angle κ with respect to the normal line of the light exit surface OS.

A direction parallel to the optical axis AX is referred to as the z direction, and among the flat surfaces perpendicular to the z direction, the horizontal direction is referred to as the x direction and the vertical direction is referred to as the y direction.

The incidence portion 21 includes a light incident surface IS and a reflection surface RS. The image light GL from the image forming device 10 enters the incidence portion 21 via the light incident surface IS. The image light GL taken into the incidence portion 21 is reflected by the reflection surface RS and is guided to the inside of the parallel light guiding body 22. The light incident surface IS is configured by a curved surface 21b that is a concave as viewed from the projection lens 12. The curved surface 21b also has a function of totally reflecting the image light GL reflected by the reflection surface RS on the inner surface side.

The reflection surface RS is configured with a curved surface 21a that is a concave as viewed from the projection lens 12. The reflection surface RS is formed of a metal film such as an aluminum film formed on the curved surface 21a by an evaporation method or the like. The reflection surface RS reflects the image light GL incident from the light incident surface IS and bends the light path. The curved surface 21b totally reflects the image light GL reflected by the reflection surface RS on the inner side and bends the light path. As such, the incidence portion 21 reflects the image light GL incident from the light incident surface IS twice and bends the light path, thereby reliably guiding the image light GL to the inside of the parallel light guiding body 22.

The parallel light guiding body 22 is a light guiding member of a flat shape parallel to the y axis and inclined with respect to the z axis. The parallel light guiding body (light guiding body) 22 is formed of a resin material and the like with light transmittance, and includes a pair of flat surfaces 22a and 22b substantially parallel to each other.

Since the flat surfaces 22a and 22b are parallel flat surfaces, enlargement and focus shift of an external image are not made. The flat surface 22a functions as a total reflection surface that totally reflects the image light from the incidence portion 21, and guides the image light GL to the exit portion 23 with a small loss. The flat surface 22a is disposed on an external side of the parallel light guiding body 22 and functions as a first total reflection surface, and is also referred to as an external side surface in the specification.

The flat surface 22b is also referred to as an observer side surface in the specification. The flat surface 22b (observer side surface) extends to one end of the exit portion 23. Here, the flat surface 22b is a boundary IF between the parallel light guiding body 22 and the exit portion 23 (refer to FIG. 3).

In the parallel light guiding body 22, the image light GL reflected by the reflection surface RS or the light incident surface IS of the incidence portion 21 is incident on the flat surface 22a which is a total reflection surface, is totally reflected by the flat surface 22a, and is guided to a +x side or an X side on which a far side of the light guiding device 20, that is, the exit portion 23 is provided. As illustrated in FIG. 2, the parallel light guiding body 22 has a vertical end surface ES as a cross section of the +x side in an outer shape of the light guiding device 20. In addition, the parallel light guiding body 22 has an upper end surface TP and a lower end surface BP as cross sections on the ±y side.

A normal of the flat surface 22b is referred to as the Z direction, and among the surfaces perpendicular to the Z direction, the horizontal direction is referred to as the X direction and the vertical direction is referred to as the Y direction.

As illustrated in FIG. 3, the exit portion 23 is formed in a plate shape along the flat surface 22b or the boundary IF on the far side (+x side) of the parallel light guiding body 22. When the image light GL totally reflected by a region FR of the flat surface (total reflection surface) 22a on the external side of the parallel light guiding body 22 is allowed to pass through, the exit portion 23 reflects the incident image light GL at a predetermined angle and bends toward the light exit surface OS side. Here, the image light GL, which is first incident to the exit portion 23 without passing through the exit portion, is a target to be exited as virtual image light. That is, although there is light reflected by an inner surface of the light exit surface OS in the exit portion 23, the light is not used as image light.

The exit portion 23 includes an optical element 30 in which a plurality of partially reflecting mirrors 31 with light transmittance are arranged in one direction. A structure of the optical element 30 will be described in detail below with reference to FIG. 4 and the like. The optical element 30 is provided along the flat surface 22b of the parallel light guiding body 22 on the observer side.

Since the light guiding device 20 has the aforementioned structure, as illustrated in FIG. 3, a light path of the image light GL exited from the image forming device 10 and incident on the light guiding device 20 from the light incident surface IS is bent by being reflected multiple times by the incidence portion 21, and the image light is totally reflected in the region FR of the flat surface 22a of the parallel light guiding body 22 and proceeds substantially along the optical axis AX. The image light GL reflected by the region FR of the flat surface 22a on the +z side is incident on the exit portion 23.

At this time, a width of the region FR in the longitudinal direction is narrower than a width of the exit portion 23 in the longitudinal direction, in an xy plane. That is, an incidence width in which a light rayof the image light GL is incident on the exit portion 23 (or the optical element 30) is wider than an incidence width in which a light ray of the image light GL is incident on the region FR. As such, by relatively narrowing the incidence width in which a light ray of the image light GL is incident on the region FR, interference of the light path is less likely to occur, and the boundary IF is not used for guiding, that is, it is easy for the image light GL from the region FR to be directly incident on the exit portion 23 (or the optical element 30) without reflecting the image light GL at the boundary IF.

As the image light GL incident on the exit portion 23 is bent at an appropriate angle in the exit portion 23, the image light can be taken out, and is finally exited from the light exit surface OS. The image light GL exited from the light exit surface OS is incident on the eye EY of an observer as virtual image light. As the virtual image light forms an image on the retina of the observer, the observer can view the image light GL of the virtual image.

Here, an angle in which the image light GL used for image formation is incident on the exit portion 23 increases as the image light moves apart from the incidence portion 21 on the light source side. That is, the image light GL which is largely inclined with respect to the Z direction parallel to the flat surface 22a on the external side or the optical axis AX is incident on the far side of the exit portion 23 and is bent at a relatively large angle, and the image light GL which is slightly inclined with respect to the Z direction or the optical axis AX is incident on an near side of the exit portion 23 and is bent at a relatively small angle.

Light Path of Image Light

Hereinafter, the light path of the image light will be described in detail.

As illustrated in FIG. 3, components exited from a central portion of an exit surface 11a denoted by a dashed line, in the image light respectively exited from the exit surface 11a of the organic EL element 11, is defined as image light GL0, and components exited from the left side (−x and +z side) of a page, in the periphery of the exit surface 11a denoted by an alternate long and short dash line, is defined as image light GL1, and components exited from the right side (+x and −z side) of the page, in the periphery of the exit surface 11a denoted by a two point chain line, is defined as image light GL2. The light path of the image light GL0 among those is assumed to extend along the optical axis AX.

Main components of the image lights GL0, GL1, and GL2 that pass through the projection lens 12 are respectively incident from the light incident surface IS of the light guiding device 20, and then proceeds to the exit portion 23 by passing through the inside of the parallel light guiding body 22 via the incidence portion 21. Specifically, the image light GL0 exited from the central portion of the exit surface 11a among the image lights GL0, GL1, and GL2 is bent by the incidence portion 21 and is coupled in the parallel light guiding body 22, and then, is incident on the region FR of the one flat surface 22a at a standard reflection angle θ0 and is totally reflected, passes through the boundary IF without being reflected by the boundary IF between the parallel light guiding body 22 and the exit portion 23 (or the optical element 30), and is directly incident on the central portion 23k of the exit portion 23. The image light GL0 is reflected at a predetermined angle in the portion 23k and is exited as parallel light flux in a direction (direction of an angle κ with respect to the Z direction) of the optical axis AX inclined with respect to the XY plane including the light exit surface OS from the light exit surface OS.

The image light GL1 exited from one end side (−x side) of the exit surface 11a is bent by the incidence portion 21 and is coupled in the parallel light guiding body 22, and then, is incident on the region FR of the flat surface 22a at a maximum reflection angle θ1 and is totally reflected, passes through the boundary IF without being reflected by the boundary IF between the parallel light guiding body 22 and the exit portion 23 (or the optical element 30), is reflected at a predetermined angle in the portion 23h of the far side (+x side), in the exit portion 23, and is exited as a parallel light flux from the light exit surface OS at a predetermined angle direction. At this time, in an exit angle γ1, an angle returning to the incidence portion 21 side is relatively large.

Meanwhile, the image light GL2 exited from the other end side (+x side) of the exit surface 11a is bent by the incidence portion 21 and coupled in the parallel light guiding body 22, and then, is incident on the region FR of the flat surface 22a at a minimum reflection angle θ2 and is totally reflected, passes through the boundary IF without being reflected by the boundary IF between the parallel light guiding body 22 and the exit portion 23 (or the optical element 30), is reflected at a predetermined angle in a portion 23m of an entrance side (−x side) in the exit portion 23, and is exited as a parallel light flux from the light exit surface OS in a predetermined angular direction. At this time, in an exit angle γ2, an angle returning to the incidence portion 21 side is relatively small.

Although three ray components denoted by the image lights GL0, GL1, and GL2 are described as representative of a part of the overall rays of the image light GL, the other ray components configuring the image light GL are also guided in the same manner as ray components of the image light GL0 and the like, and are exited from the light exit surface OS. Accordingly, illustration and description of these will be omitted.

Here, a value of a critical angle θc is θc≈45.6° on the assumption that n=1.4 as an example of a value of a refractive index n of a transparent resin material used for the incidence portion 21 and the parallel light guiding body 22. As the minimum reflection angle θ2 among the reflection angles θ0, θ1, and θ2 of the image lights GL0, GL1, and GL2 is set to a value larger than the critical angle θc, it is possible to satisfy total reflection conditions for necessary image light.

The image light GL0 directed to the center is incident on a portion 23k of the exit portion 23 at an elevation angle φ0 (=90°−θ0). The image light GL1 directed to the periphery is incident on a portion 23h of the exit portion 23 at an elevation angle φ1 (=90°−θ1). The image light GL2 directed to the periphery is incident on a portion 23m of the exit portion 23 at an elevation angle φ(=90°−θ2). Here, a relationship of φ2>φ0>φ1 is established between the elevation angles φ0, φ1, and φ2, by reflecting a magnitude relationship of the reflection angles θ0, θ1, and θ2. That is, an incidence angle ι (refer to FIG. 4) on the partially reflecting mirror 31 of the optical element 30 gradually decreases in the order of the portion 23m corresponding to the elevation angle φ2, the portion 23k corresponding to the elevation angle φ0, and the portion 23h corresponding to the elevation angle φ1. In other words, the incidence angle ι on the partially reflecting mirror 31 or the reflection angle by the partially reflecting mirror 31 decreases as the light moves apart from the incidence portion 21.

An overall behavior of the light ray of the image light GL reflected by the flat surface 22a on the external side of the parallel light guiding body 22 toward the exit portion 23 will be described.

As illustrated in FIG. 3, the light ray of the image light GL has a width being narrowed in any one of straight light paths P1 and P2 before and after being reflected by the region FR on the external side of the parallel light guiding body 22, in a cross section including the optical axis AX. Specifically, the light ray of the image light GL has a width being narrowed and a beam width being narrowed as a whole at a position which straddles the straight light paths P1 and P2 in the vicinity of the region FR, that is, in the vicinity of the boundary between the straight light paths P1 and P2, in a cross section including the optical axis AX. Thereby, the light ray of the image light GL is narrowed in front of the exit portion 23, and a viewing angle in the lateral direction is widened relatively and easily.

In the described example, the width is narrowed at a position where ray flux of the image light GL straddles the straight light paths P1 and P2 and thereby a beam width of the image light GL is narrowed, but the width may be narrowed only on one side of the straight light paths P1 and P2 and thereby the beam width may be narrowed.

Configuration of Optical Element

Hereinafter, a configuration of the optical element 30 configuring the exit portion 23 will be described.

Figure 4:
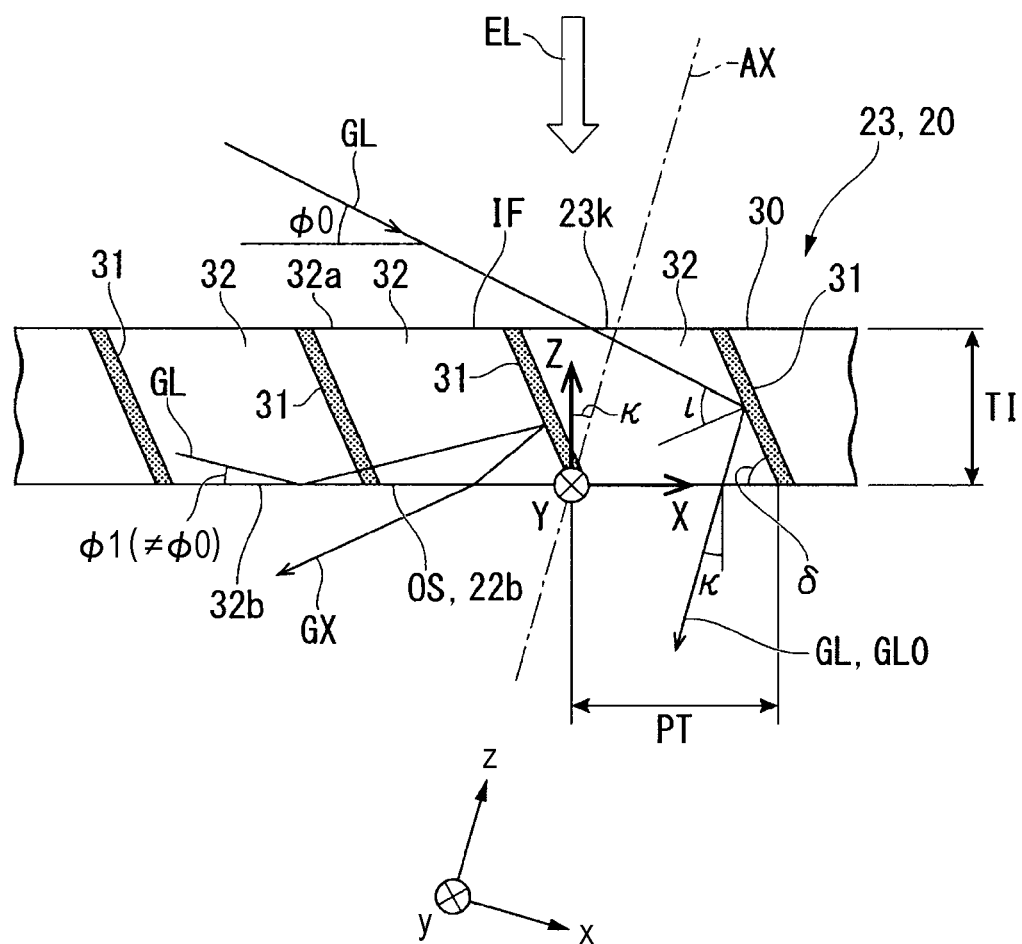
FIG. 4 is an enlarged view of an optical element according to the embodiment.

FIG. 4 is an enlarged view of the optical element 30 according to the present embodiment.

The exit portion 23 is configured by the optical element 30 provided on a viewing side surface of the parallel light guiding body 22. Therefore, the exit portion 23 is provided along the XY plane inclined by an angle κ with respect to the optical axis AX in the same manner as the parallel light guiding body 22.

As illustrated in FIG. 4, the optical element 30 includes a plurality of partially reflecting mirrors 31 and a plurality of transmittance members 32. The plurality of partially reflecting mirrors 31 are provided in parallel to each other with an interval therebetween, reflect a part of the image light GL and the external light EL, and transmit the other part of the image light GL and the external light EL. The transmittance member 32 is interposed between adjacent two partially reflecting mirrors 31 of the plurality of partially reflecting mirrors 31. That is, the optical element 30 has a configuration in which the partially reflecting mirror 31 is interposed between adjacent two transmittance members 32 among the plurality of transmittance members 32. In other words, the optical element 30 has a configuration in which the partially reflecting mirrors 31 and the transmittance members 32 are alternately arranged.

The transmittance member 32 is a columnar member having a parallelogram-shaped sectional shape perpendicular to the longitudinal direction. Therefore, the transmittance member 32 has two sets of a pair of flat surfaces extending in parallel in the longitudinal direction and parallel to each other. Among one pair of flat surfaces of the two sets, one flat surface of the one set is an incidence surface 32a on which the image light GL and the external light EL are incident, the other flat surface of the one set is an exit surface 32b from which the image light GL and the external light EL exit. In addition, the partially reflecting mirror 31 is provided on one flat surface of the other set. The transmittance member 32 is formed of, for example, glass, transparent resin, or the like.

The plurality of transmittance members 32 are configured such that the plurality of partially reflecting mirrors 31 are arranged in parallel with each other, when a plurality of sets configured with a pair of the transmittance member 32 and the partially reflecting mirror 31 are combined together. While not illustrated in FIG. 4, an adhesive layer is provided between one surface of the partially reflecting mirror 31 and the adjacent transmittance member 32. Thereby, the optical element 30 has a rectangular plate shaped member as a whole. If the optical element 30 is viewed from a normal direction of the incidence surface 32a or the exit surface 32b of the transmittance member 32, the optical element has a structure in which a plurality of thin band shaped partially reflecting mirrors 31 are arranged in a stripe shape. That is, the optical element 30 has a configuration in which a plurality of rectangular partially reflecting mirrors 31 are arranged at a predetermined interval (pitch PT) in a direction in which the parallel light guiding body 22 extends, that is, in the X direction.

The partially reflecting mirror 31 is formed of a reflective film interposed between the transmittance members 32. The reflective film is configured by a dielectric multilayer film in which a plurality of thin dielectric films having different refractive indices are alternately laminated. Alternatively, the reflective film may be formed of a metal film. The partially reflecting mirror 31 is provided such that a short side of the partially reflecting mirror 31 is inclined with respect to the incidence surface 32a and the exit surface 32b of the transmittance member 32. More specifically, the partially reflecting mirror 31 is inclined such that a reflection surface faces the incidence portion 21 toward the outside of the parallel light guiding body 22. In other words, the partially reflecting mirror 31 is inclined in a direction in which an upper end (+Z side) rotates counterclockwise with respect to the YZ plane orthogonal to the flat surfaces 22a and 22b by using a long side (Y direction) of the partially reflecting mirror 31 as an axis.

A reflectance of the partially reflecting mirror 31 with respect to the image light GL is, for example, higher than or equal to 10% or lower than 50% in an incidence angle range of the assumed image light GL from a viewpoint of transmitting the external light EL by the see-through and easily observing an external image. In addition, the partially reflecting mirror 31 has characteristics in which a reflectance of the image light GL incident at a relatively small incidence angle with respect to a surface of the partially reflecting mirror 31 is lower than a reflectance of the image light GL incident at a relatively large incidence angle. An operation and effects associated with the characteristics will be described below in detail.

Hereinafter, an angle between the reflection surface of the partially reflecting mirror 31 and the exit surface 32b of the transmittance member 32 is defined as an inclination angle δ of the partially reflecting mirror 31. In the present embodiment, the inclination angle δ of the partially reflecting mirror 31 is greater than or equal to 45° and smaller than 90°. In the present embodiment, the refractive index of the transmittance member 32 is equal to the refractive index of the parallel light guiding body 22, but the refractive indices thereof may be different from each other. In a case where the refractive index is different, it is necessary to change the inclination angle δ of the partially reflecting mirror 31 with respect to a case where the refractive indices are equal.

Each of the plurality of partially reflecting mirrors 31 forms an inclination angle δ of, for example, approximately 48° to 70° in a clockwise direction with respect to an observer side surface 22b of the parallel light guiding body 22, specifically, forms the inclination angle δ of, for example, 60°. Here, it is assumed that an elevation angle $\phi 0$ of the image light GL0 is set to, for example, 30°, the elevation angle $\phi 1$ of the image light GL1 is set to, for example, 22°, and the elevation angle $\phi 2$ of the image light GL2 is set to, for example, 38°. In this case, as illustrated in FIG. 3, the image light GL1 and the image light GL2 are incident on the eyes EY of an observer at an angle $\gamma 1 = \gamma 2 \approx 12.5°$ with respect to the optical axis AX.

Thereby, in a case where components (image light GL1) having a relatively large total reflection angle in the image light GL are mainly incident on a −x side portion 23h of the exit portion 23, and components (image light GL2) having a relatively small total reflection angle are mainly incident on a +x side portion 23m of the exit portion 23, the image light GL is efficiently extracted at an angle for collecting the image light in the eyes EY of an observer as a whole. That is, it is possible to efficiently extract the image light GL incident from the parallel light guiding body 22 on the incidence surface 32a of the optical element 30 at a relatively large incidence angle (relatively small elevation angle), from the parallel light guiding body 22. Since the optical element 30 is configured to extract the image light GL at such an angle, the light guiding device 20 can make the image light GL pass through only one time without making the image light GL pass through in the optical element 30 in plural times in principle. Thereby, it is possible to extract the image light GL as virtual image light with a small loss.

The pitch PT between the adjacent partially reflecting mirrors 31 is set to approximately 0.5 mm to 2.0 mm. Strictly speaking, the pitch PT between the partially reflecting mirrors 31 is not equally spaced but may be disposed at a variable pitch. More specifically, the pitch PT of the partially reflecting mirror 31 in the optical element 30 may be a random pitch that randomly increases or decreases around the reference interval. As such, by arranging the partially reflecting mirrors 31 in the optical element 30 at random pitches, occurrence of diffraction unevenness and moire can be suppressed. A predetermined pitch pattern including not only the random pitch but also the pitch that increases and decreases in a plurality of stages may be repeated.

A thickness of the optical element 30, that is, a thickness TI of the partially reflecting mirror 31 in the Z-axis direction is set to approximately 0.7 mm to 3.0 mm. A thickness of the parallel light guiding body 22 supporting the optical element 30 is, for example, approximately several mm to 10 mm, preferably, approximately 4 mm to 6 mm. If the thickness of the parallel light guiding body 22 is much larger than the thickness of the optical element 30, the incidence angle of the image light GL on the optical element 30 or the boundary IF may be easily reduced, and reflection by the partially reflecting mirror 31 at a position where the image light GL does not enter the eye EY is easily suppressed. Meanwhile, if the thickness of the parallel light guiding body 22 is relatively thin, weights of the parallel light guiding body 22 and the light guiding device 20 are easily reduced.

Figure 5:
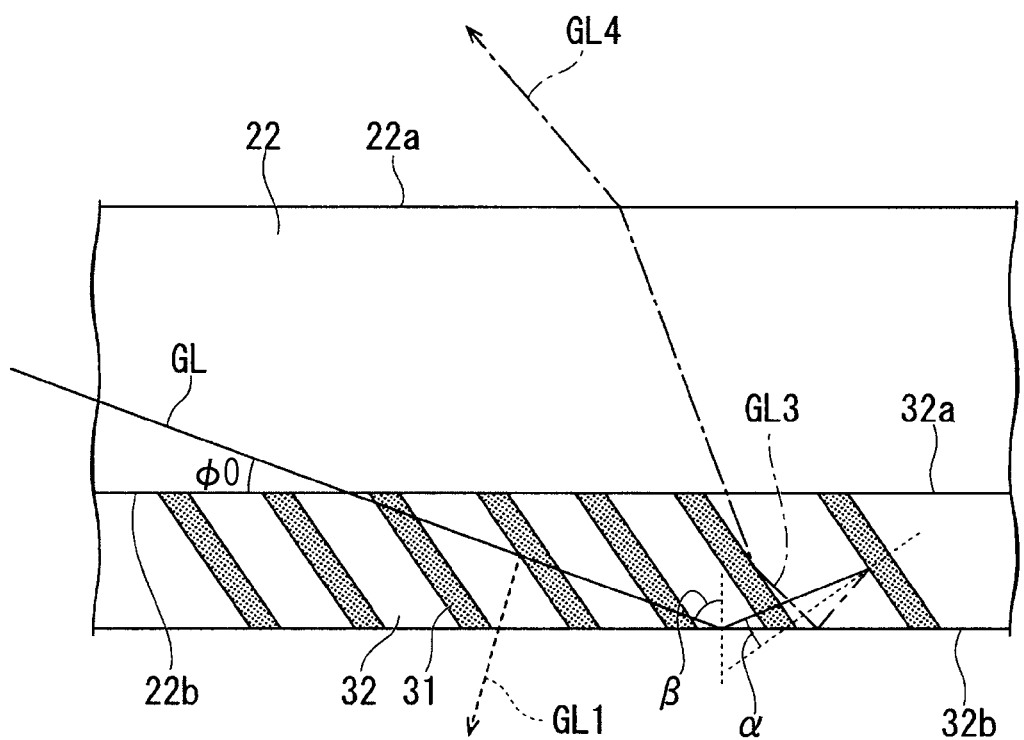
FIG. 5 is a diagram illustrating an operation of the optical element.

FIG. 5 is a diagram illustrating an operation of the optical element 30.

The inventor investigated a cause of leaks of the image light GL in a display device which uses an optical element in the related art by using a ray tracing simulation.

As illustrated in FIG. 5, it is assumed that image light GL is incident on the optical element 30 at an elevation angle $\phi 0 = 30°$. The reflected light GL1 denoted by an arrow of a dashed line causes an observer to view an image as virtual image light. However, there is a certain amount of light passing through the partially reflecting mirror 31 without being deflected toward the observer side, in the image light GL incident on the partially reflecting mirror 31. For example, in a case where a reflectance of the partially reflecting mirror 31 is 20%, if the image light GL passes through the four partially reflecting mirrors 31, it can be seen that the image light GL of approximately 40% passes through the partially reflecting mirrors 31 among the image light GL incident on the partially reflecting mirrors 31 from $(1-0.2)^4=0.41$.

Next, since the image light GL that passes through the partially reflecting mirrors 31 is incident on the exit surface 32b at an incidence angle β of approximately 60°, the image light is totally reflected by the exit surface 32b and thereafter, advances toward the partially reflecting mirrors 31. The image light GL of approximately 60% (1−0.41=0.59) is totally reflected by the partially reflecting mirrors 31 among the image light GL totally reflected by the exit surface 32b as indicated by an arrow GL3 of a one-dot chain line, and thereafter, returns to the exit surface 32b again. At this time, light having an angle larger than a critical angle of the exit surface 32b is totally reflected by the exit surface 32b again. Since the light totally reflected by the exit surface 32b is incident on the partially reflecting mirrors 31 at a relatively large incidence angle, the light is reflected by the partially reflecting mirrors 31, passes through the parallel light guiding body 22, and is exited in a direction opposite to an observer side from the flat surface 22a. Due to the light GL4, a problem occurs in which an image is viewed to a person other than the observer and confidentiality of an image is lost.

Therefore, the inventor thought that the aforementioned problem can be solved by reducing the light which is totally reflected by the exit surface 32b, is reflected by the partially reflecting mirrors 31, and returns to the exit surface 32b again. The light advancing toward the partially reflecting mirrors 31 after being totally reflected by the exit surface 32b, is incident on the partially reflecting mirrors 31 at a relatively small incidence angle α. Accordingly, the above problem can be solved by using the partially reflecting mirror 31 having incidence angle dependence in which a reflectance of the image light GL incident at a relatively small incidence angle α with respect to a surface of the partially reflecting mirror 31 is lower than a reflectance of the image light GL incident at a relatively large incidence angle α.

A lamination film configured by various inorganic materials and metal materials of eight layers illustrated in Table 1 was used as the partially reflecting mirror 31 of an example for the ray tracing simulation. In addition, a lamination film configured by various inorganic materials and metal materials of eight layers illustrated in Table 2 was used as the partially reflecting mirror of a comparative example.

TABLE 1

| # | Material | Thickness [nm] |
|---|---|---|
| 1 | SiO$_2$ | 7.4 |
| 2 | ZrO$_2$ | 15.7 |
| 3 | SiO$_2$ | 89.5 |
| 4 | ZrO$_2$ | 39.8 |
| 5 | Ag | 12.8 |
| 6 | TiO$_2$ | 58.2 |
| 7 | Al$_2$O$_3$ | 90.9 |
| 8 | Nb$_2$O$_5$ | 6.8 |

TABLE 2

| # | Material | Thickness [nm] |
|---|---|---|
| 1 | ZrO$_2$ | 56.3 |
| 2 | Ag | 12.4 |
| 3 | SiO$_2$ | 12.9 |
| 4 | TiO$_2$ | 45.0 |
| 5 | ZrO$_2$ | 15.8 |
| 6 | Al$_2$O$_3$ | 31.7 |
| 7 | Nb$_2$O$_5$ | 17.0 |
| 8 | Al$_2$O$_3$ | 56.9 |

Figure 6:
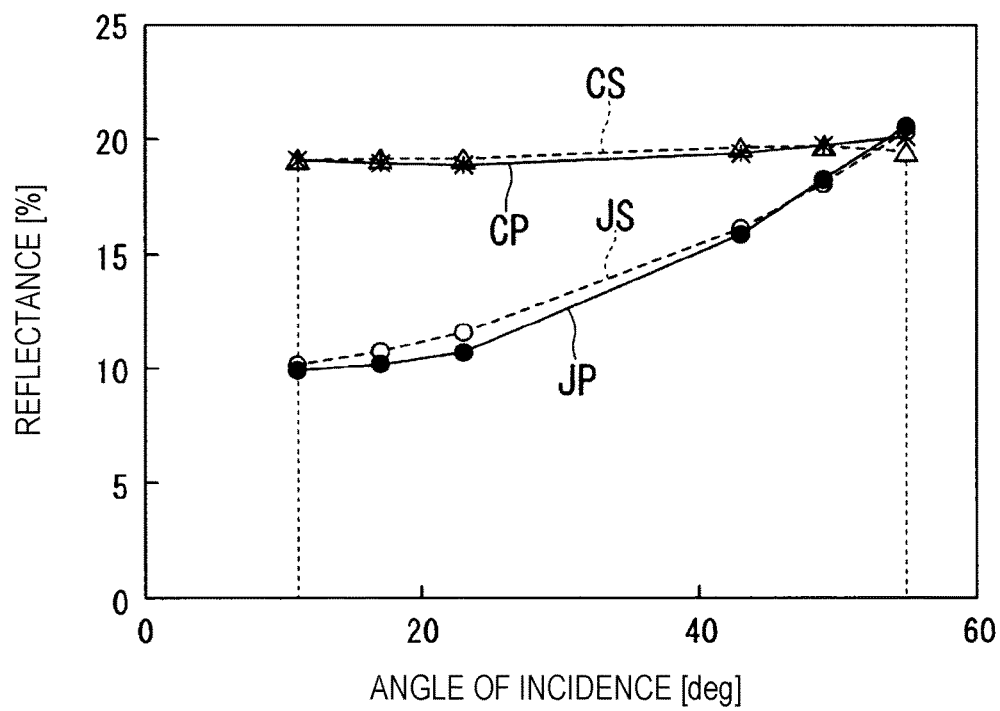
FIG. 6 is a graph illustrating incidence angle dependence of a reflectance of a partially reflecting mirror of an example and a comparative example.

FIG. 6 is graphs illustrating incidence angle dependence of a reflectance of the partially reflecting mirror of the example and the comparative example. A horizontal axis of the graphs denotes an incidence angle [deg], and a vertical axis denotes the reflectance [%].

As for the reflectance, a reflectance for S-polarized light components and a reflectance for P-polarized light components were separately calculated.

The graph of a symbol JS represents a reflectance of the partially reflecting mirror of the example with respect to the S-polarized light components, and the graph of a symbol JP represents a reflectance of the partially reflecting mirror of the example with respect to the P-polarized light components. The graph of a symbol CS represents a reflectance of the partially reflecting mirror of the comparative example with respect to the S-polarized light components and the graph of a symbol CP represent a reflectance of the partially reflecting mirror of the comparative example with respect to the P-polarized light components.

As illustrated in FIG. 6, in each of the partially reflecting mirror of the example and the partially reflecting mirror of the comparative example, the reflectance for the S-polarized light components and the reflectance for the P-polarized light components represent substantially the same characteristics. The reflectance of the partially reflecting mirror of the comparative example represents a constant value of approximately 20% over a range of the incidence angle of 10° to 55°. When the incidence angles are 11°, 17°, 23°, 43°, 49°, and 55°, the reflectances with respect to the S-polarized light components of the comparative example are 19.1%, 19.1%, 19.1%, 19.6%, 19.7%, and 19.4% and the reflectances with respect to the P-polarized light components of the comparative example are 19.0%, 18.9%, 18.8%, 19.3%, 19.7%, and 20.1%. That is, the partially reflecting mirror of the comparative example has almost no incidence angle dependence of the reflectance. In contrast to this, the reflectance of the partially reflecting mirror of the example is approximately 20% which is equal to the comparative example at an incidence angle of 55°, but decreases as the incidence angle decreases from 55°, and decreases to approximately 10% at the incidence angle of 10°. When the incidence angles are 11°, 17°, 23°, 43°, 49°, and 55°, the reflectances with respect to the S-polarized light components of the example are 10.1%, 10.7%, 11.6%, 16.1%, 18.0%, and 20.3% and the reflectances with respect to the P-polarized light components of the example are 9.9%, 10.2%, 10.7%, 15.8%, 18.2%, and 20.5%.

As such, by changing the material (lamination sequence) and a thickness of the lamination film configuring the partially reflecting mirror 31, the incidence angle dependence of the reflectance of the partially reflecting mirror 31 can be adjusted, and it is possible to realize the partially reflecting mirror 31 having characteristics (incidence angle dependence) in which the reflectance of light incident at the relatively low incidence angle α is lower than the reflectance of light incident at a relatively large incidence angle α.

Figure 7:
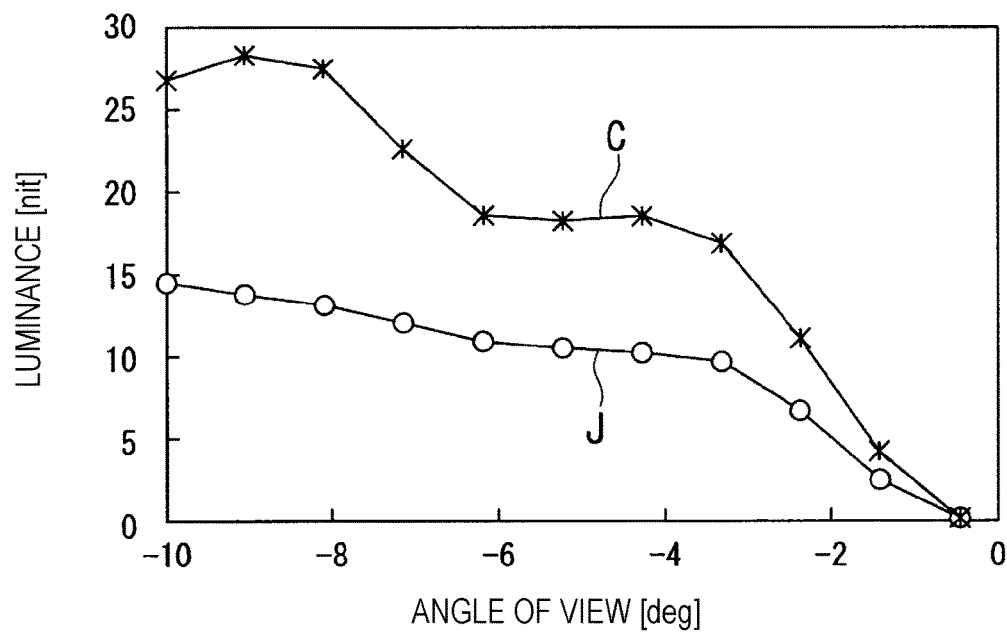
FIG. 7 is a graph illustrating a luminance distribution of a backside image generated by an optical element of the example and the comparative example.

FIG. 7 is graphs illustrating a luminance distribution of a backside image by the optical elements of the example and the comparative example. The backside image is an image generated by light leaked from the flat surface 22a (backside) of the parallel light guiding body 22 opposite to the optical element 30. The horizontal axis of the graph denotes an angle of view [deg], and the vertical axis denotes a luminance [nit]. An angle of view is an angle corresponding to each position of the backside image, which uses the optical axis AX as a reference (0°).

The graph symbolized by J represents a luminance distribution of the backside image in the display device which uses the partially reflecting mirror of the example, and the graph of the symbol C represents a luminance distribution of the backside image in the display device which uses the partially reflecting mirror of the comparative example.

As a result of performing a simulation under the condition that the luminance of an image on an observer side is 405 nit, the luminance of the backside image shifts around the center of approximately 20 to 30 nit in the display device provided with the partially reflecting mirror of the comparative example. In contrast to this, in the display device 100 provided with the partially reflecting mirror 31 of the example, the luminance of the backside image shifts around the center of approximately 10 to 15 nit. As such, it is found that the display device 100 including the partially reflecting mirror 31 of the example can reduce brightness of the backside image by approximately half with respect to the display device having the partially reflecting mirror of the comparative example.

As described above, since the optical element 30 according to the present embodiment includes the partially reflecting mirror 31 having characteristics in which a reflectance of light incident at a relatively small incidence angle α is lower than a reflectance of light incident at a relatively large incidence angle α, it is possible to reduce leaks of the image light from the flat surface 22a side of the parallel light guiding body 22. As a result, according to the present embodiment, it is possible to realize the display device 100 which is hard for a person other than an observer to view an image and has excellent confidentiality of the image.

In addition, in the display device 100 according to the present embodiment, since the exit portion 23 is provided on the flat surface 22b on a viewing side of the parallel light guiding body 22, the image light GL exited from the optical element 30 reaches the eyes of an observer without being incident other members. Therefore, it is possible to realize the display device 100 whose optical design is easily performed.

The technical scope of the disclosure is not limited to the aforementioned embodiments, and various modifications can be made in a range without departing from the gist of the disclosure.

For example, in the above embodiment, it is assumed that a partially reflecting mirror having the same incidence angle dependence of a reflectance is used over all the partially reflecting mirrors configuring the optical element. However, instead of the configuration, for example, plural kinds of partially reflecting mirrors may be used in which incidence angle dependences of a reflectance change depending on a position of an optical element.

Besides, specific configurations of each portion such as the number, shapes, materials, and the like of each configuration element included in the optical element and the display device are not limited to the above embodiments, and can be appropriately changed. For example, a liquid crystal display element, a combination of a laser light source and a MEMS scanner, or the like may be used as an image forming device in addition to the aforementioned organic EL element.

The entire disclosure of Japanese Patent Application No.: 2016-186606, filed Sep. 26, 2016 and 2017-138794, filed Jul. 18, 2017 are expressly incorporated by reference herein.

What is claimed is:

1. An optical element comprising:
a plurality of partially reflecting mirrors that are provided in parallel to each other with an interval therebetween, reflect a part of an image light and a part of an external light, and transmit the other part of the image light and the other part of the external light; and
a transmittance member that is interposed between adjacent two partially reflecting mirrors of the plurality of partially reflecting mirrors,
wherein the transmittance member has an incidence surface on which the image light and the external light are incident through a light guiding body, and an exit surface from which the image light and the external light are exited to an observer side, and
wherein each of the plurality of partially reflecting mirrors is disposed so as to be inclined with respect to the incidence surface and the exit surface, and a reflectance of light incident at a relatively small incidence angle with respect to surfaces of each partially reflecting mirror is lower than a reflectance of light incident at a relatively large incidence angle.

2. The optical element according to claim 1, wherein, an angle formed between each of the plurality of partially reflecting mirrors and the exit surface is larger than or equal to 45° and smaller than 90°.

3. A display device comprising:
an image forming device; and
a light guiding device that guides image light which is generated by the image forming device,
wherein the light guiding device includes an incidence portion on which the image light is incident, a light guiding body that guides the image light which is incident from the incidence portion, and an exit portion from which the image light is exited, and
wherein the exit portion includes the optical element according to claim 1.

4. A display device comprising:
an image forming device; and
a light guiding device that guides image light which is generated by the image forming device,
wherein the light guiding device includes an incidence portion on which the image light is incident, a light guiding body that guides the image light which is incident from the incidence portion, and an exit portion from which the image light is exited, and
wherein the exit portion includes the optical element according to claim 2.

5. The display device according to claim 3, wherein the exit portion is provided on a surface on a viewing side of the light guiding body.

6. The display device according to claim 4, wherein the exit portion is provided on a surface on a viewing side of the light guiding body.

* * * * *